United States Patent
Yeoh et al.

(10) Patent No.: US 9,288,842 B2
(45) Date of Patent: Mar. 15, 2016

(54) SYSTEM AND METHOD FOR PROVIDING MULTIPLE IDENTIFIERS IN A SINGLE ACCESS POINT

(71) Applicant: Telekom Malaysia Berhad, Kuala Lumpur (MY)

(72) Inventors: Chun Yeow Yeoh, Selangor (MY); Mohammad Harris Mokhtar, Selangor (MY); Anuar Musa, Selangor (MY)

(73) Assignee: Telekom Malaysia Berhad, Kuala Lumpur (MY)

( * ) Notice: Subject to any disclaimer, the term of this patent is extended or adjusted under 35 U.S.C. 154(b) by 2 days.

(21) Appl. No.: 13/724,027

(22) Filed: Dec. 21, 2012

(65) Prior Publication Data

US 2013/0163515 A1    Jun. 27, 2013

(30) Foreign Application Priority Data

Dec. 23, 2011    (MY) ............................ PI 2011700205

(51) Int. Cl.
*H04W 4/00*     (2009.01)
*H04W 88/08*    (2009.01)
*H04W 8/26*     (2009.01)

(52) U.S. Cl.
CPC .............. *H04W 88/08* (2013.01); *H04W 8/26* (2013.01)

(58) Field of Classification Search
CPC ..................................................... H04W 88/10
USPC ........................................................ 370/328
See application file for complete search history.

(56) References Cited

U.S. PATENT DOCUMENTS

| 8,036,195 | B2 | 10/2011 | Thompson | |
|---|---|---|---|---|
| 8,077,689 | B1 * | 12/2011 | Jones et al. | 370/338 |
| 8,438,389 | B2 * | 5/2013 | Yao et al. | 713/168 |
| 2008/0016556 | A1 * | 1/2008 | Selignan | 726/7 |
| 2012/0044862 | A1 * | 2/2012 | Chen et al. | 370/328 |
| 2012/0166662 | A1 * | 6/2012 | Iyer | 709/229 |
| 2013/0028176 | A1 * | 1/2013 | Le Sage | 370/328 |

FOREIGN PATENT DOCUMENTS

WO    2011/022171 A2    2/2011

OTHER PUBLICATIONS

IEEE, Ghannam Aljabari et al, Virtualization of wireless LAN Infrastructures, Sep. 15-17, 2011, entire document.*
I EEE, Ghannam Aljabari et al, Virtualization of wireless LAN Infrastructures, Sep. 15-17, 2011, entire document.*

(Continued)

*Primary Examiner* — Maharishi Khirodhar
(74) *Attorney, Agent, or Firm* — Christensen O'Connor Johnson Kindness PLLC

(57) ABSTRACT

A system within a single access point comprises a network management module, a virtual access point creation module and a data traffic handling module. The virtual access point creation module creates multiple virtual access points each represented by a unique service set identifier (SSID). The network management module provides at least one tunnel to accommodate the multiple virtual access points. The data traffic handling module receives and redirects data from the multiple virtual access points to and from the at least one tunnel.

13 Claims, 4 Drawing Sheets

(56) References Cited

OTHER PUBLICATIONS

"Understanding Virtual Access Points and VLANs," © 1999-2014 Juniper Networks, Inc., published Nov. 4, 2011, <http://www.juniper.net/techpubs/en_US/junos11.4/topics/concept/wlan-ax411-virtual-access-point-vlan-understanding.html>[retrieved Mar. 31, 2015], 1 page.

Substantive Examination Adverse Report mailed Jun. 30, 2015, issued in corresponding Malaysian Application No. PI 2011700205, filed Dec. 23, 2011, 6 pages.

Ruchi, "Macchanger—Utility for manipulating the MAC address of network interfaces (Included GUI Utility)," Ubuntu Geek, Jul. 1, 2010 <http://www.ubuntugeek.com/macchanger-utility-for-manipulating-the-mac-address-of-network-interfaces-included-gui-utility.html> [retrieved Jun. 30, 2015], 4 pages.

* cited by examiner

SYSTEM AND METHOD FOR PROVIDING MULTIPLE IDENTIFIERS IN A SINGLE ACCESS POINT

CROSS-REFERENCE TO RELATED APPLICATION

This application claims priority to Malaysian Patent Application No. PI 2011700205, filed on Dec. 23, 2011.

FIELD

The present disclosure relates generally to networking, and more particularly, providing multiple authorized service set identifiers to create multiple wireless hotspots in a single wireless access point.

BACKGROUND ART

A radio-based technology, known in the art as wireless fidelity ("Wi-Fi") involves a standard communications protocol that enables wireless networking. In accordance with the known IEEE 802.11n protocol, as defined by the Institute of Electrical and Electronic Engineers, Inc. ("IEEE"), devices are able to transmit at a speed of 130 megabits per second ("Mbps") operating in the 2.4 gigahertz (GHz) frequency band using two spatial streams utilizing the Multiple Input Multiple Output ("MIMO") technology. This has doubled the throughput of the IEEE 802.11g standard. Wireless transmission is within a limited range or distance, for example, about 300 meters. A wireless router that provides an "access point," also referred to in the art as a "gateway," manages the Internet communication among the devices. Computing devices equipped with Wi-Fi adapters can access the Internet once they are properly configured to associate with the wireless access point.

Wireless hotspots have contributed to the increased mobility of wireless users accessing the Internet without requiring a physical connection. Wireless hotspots are usually common in Food and Beverage ("F&B") sectors, government institutions, etc. These hotspots are set up to provide network connectivity to users on the move. Currently, 3G operators are looking to offload their users' bandwidth to Wi-Fi due to 3G's high cost and limited speed. Thus, there are attempts from different network service providers to acquire hotspot locations to build their own Wi-Fi infrastructure. The network service providers have faced difficulty acquiring suitable locations due to competition with each other. Also, the providers of hotspots need to maintain the sites and the cost is usually not cheap.

SUMMARY

Described herein are a system and method for providing multiple identifiers in a single access point, and, more particularly, providing multiple authorized service set identifiers to create multiple wireless hotspots in a single wireless access point. The present disclosure describes embodiments that aim to allow various network service providers to share a single wireless access point in a given physical location to serve their respective users.

One aspect of the present disclosure is a method for providing multiple service set identifiers (SSIDs) in a single access point. The method comprises creating multiple virtual access points, each represented by a unique SSID, providing at least one tunnel to accommodate the multiple virtual access point, and receiving and redirecting data from the multiple virtual access points to and from the at least one tunnel.

In one embodiment of the present disclosure, multiple virtual access points, each represented by a unique SSID, are created in response to a request received from an administrator.

In another embodiment of the present disclosure, the method further comprises authorizing, authenticating, and accounting of data from the multiple virtual access points.

In yet another embodiment of the present disclosure, the method further comprises authorizing, authenticating, and accounting of data from the multiple virtual access points via an external RADIUS server.

Another aspect of the present disclosure is a system for providing multiple SSIDs in a single access point. The system within the access point comprises a network management module, a virtual access point creation module, and a data traffic handling module. The virtual access point creation module creates multiple virtual access points each represented by a unique SSID. The network management module provides at least one tunnel to accommodate the multiple virtual access points. The data traffic handling module receives and redirects data from the multiple virtual access points to and from the at least one tunnel.

In one embodiment of the present disclosure, the virtual access point creation module creates multiple virtual access points each represented by a unique SSID in response to a request received from an administrator through the network management module.

In another embodiment of the present disclosure, the system further comprises a security management module for the purpose of authorization, authentication, and accounting of data from the multiple virtual access points.

In yet another embodiment of the present disclosure, the system further comprises an external RADIUS server for the purpose of authorization, authentication, and accounting of data from the multiple virtual access points.

The present disclosure consists of features and a combination of parts hereinafter fully described and illustrated in the accompanying drawings, it being understood that various changes in the details may be made without departing from the scope of the disclosure or sacrificing any of the advantages of the present disclosure.

BRIEF DESCRIPTION OF THE ACCOMPANYING DRAWINGS

To further clarify various aspects of some embodiments of the present disclosure, a more particular description will be rendered by references to specific embodiments thereof, which are illustrated, in the appended drawings. It is appreciated that these drawings depict only typical embodiments of the disclosure and are therefore not to be considered limiting of its scope. The disclosure will be described and explained with additional specificity and detail through the accompanying drawings in which.

DETAILED DESCRIPTION

The present disclosure relates to a system and method for providing multiple authorized service set identifiers to create multiple wireless hotspots in a single wireless access point. Hereinafter, this specification will describe embodiments of the present disclosure. However, it is to be understood that the described embodiments merely to facilitate discussion of the invention, and it is envisioned that those skilled in the art may devise various modifications and equivalents without departing from the scope of the claimed subject matter.

In an embodiment of the present disclosure, multiple service set identifiers (SSIDs) are enabled in a single access point or wireless access point to provide multiple wireless hotspots from one physical device, i.e., the single wireless access point. The wireless access point is physically located at a publicly accessible location, allowing the single wireless access point to serve users or customers from multiple network service providers. Therefore, network service providers are able to share a single wireless access point in a given physical location to serve their respective users.

Figure 1:
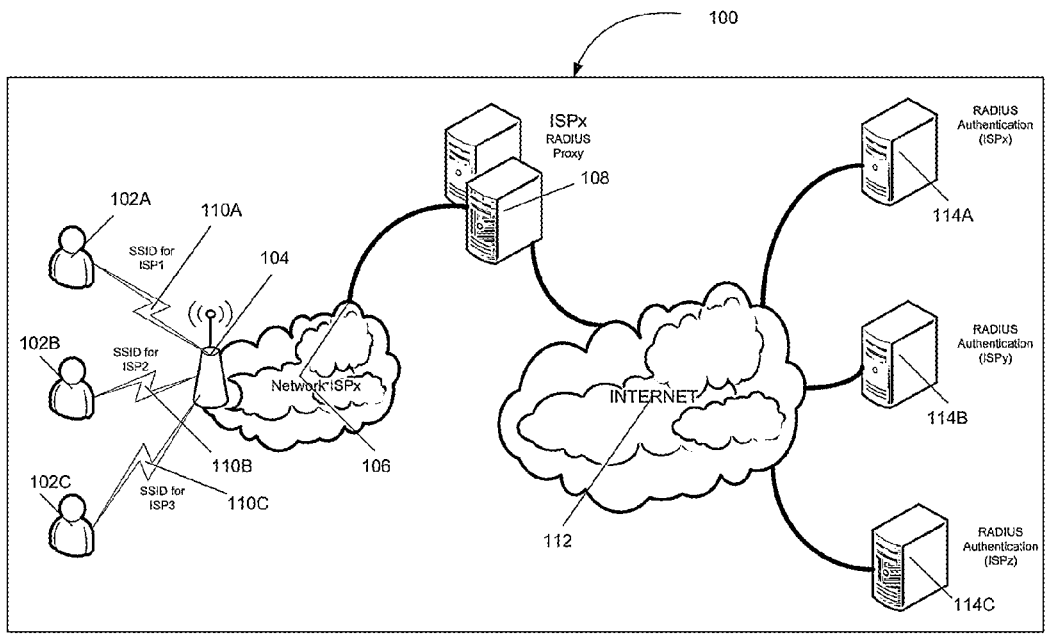
FIG. 1 is a block diagram illustrating an example network arrangement of other components associated with an access point according to the present disclosure.

Reference is made to FIG. 1. FIG. 1 is a block diagram illustrating an example network arrangement of other components associated with an access point according to the present disclosure. Multiple service set identifiers (110A, 110B, 110C) are enabled to allow users (102A, 102B, 102C) of various network service providers to access the Internet. The Wi-Fi network is provided by the wireless access point or wireless gateway device (104), and it is connected to the network (106) provided by one of the network service providers (108). The network (106) is further connected to a global communication network or backhaul network (112). The information processors (114A, 114B, 114C) operate as RADIUS servers for user authentication and are accessible from the global communication network or backhaul network (112). The activities of users (102A, 102B, 102C) are authorized and accounted for in the information processors (114A, 114B, 114C) respectively. The network service provider of the network (106) is also allowed to authorize, authenticate, and account for the activities of all the users (102A, 102B, 102C). Each wireless hotspot is considered fully owned by the various network service providers.

Figure 2:
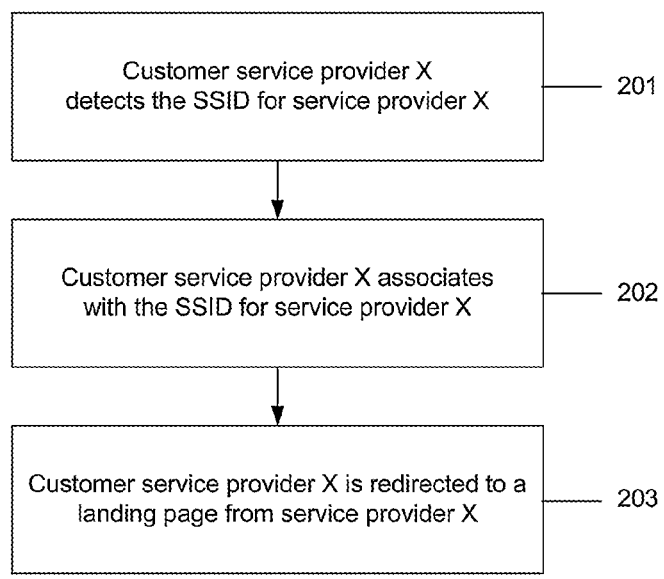
FIG. 2 illustrates a flowchart of the method for providing a unique landing page for a user of a particular network service provider.

Reference is now made to FIG. 2. FIG. 2 illustrates a flowchart of the method for providing a unique landing page for a user of a particular network service provider. This begins with the user of the particular network service provider detecting the SSID created by the wireless access point that is dedicated to its network service provider (201). Upon detecting, the user then associates to the SSID created by the wireless access point (202). The user is then redirected to a landing page of its network providers (203).

Figure 3:
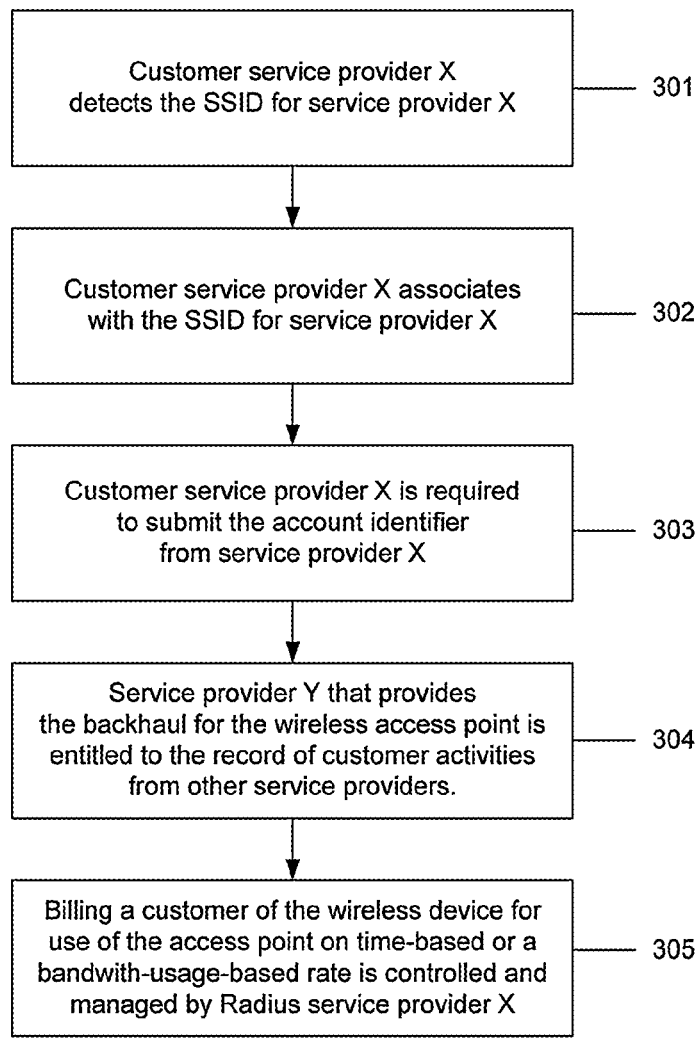
FIG. 3 illustrates a flowchart of the method for authorizing, authenticating, and accounting of data using multiple service set identifiers (SSIDs) to allow various network service providers to authorize, authenticate, and account individual users.

Reference is now made to FIG. 3. FIG. 3 illustrates a flowchart of the method for authorizing, authenticating, and accounting of data using multiple SSIDs to allow various network service providers to authorize, authenticate, and account individual users. Each network service provider can control and manage their users using their own authenticating, authorization, and accounting entities whenever their users associate with their specific SSID. This begins with the user of the particular network service provider detecting the SSID created by the wireless access point that is dedicated to its network service provider (301). Upon detecting, the user then associates to the SSID created by the wireless access point (302). The user is then required to submit an account identifier to the RADIUS server of the network service provider for authentication (303). Once authenticated, the network service provider of the global communication network or backhaul network is able to perform the accounting for the particular user (304). The user accounting information is monitored by RADIUS server of the particular network service provider (305).

Figure 4:
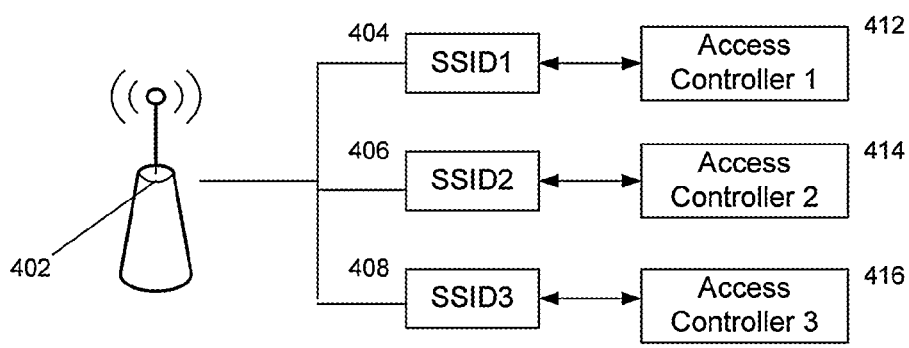
FIG. 4 is a block diagram illustrating a single access point with multiple virtual access points, each represented by a unique SSID and access controller modules.

Reference is now made to FIG. 4. FIG. 4 is a block diagram illustrating a single access point with multiple virtual access points, each represented by a unique SSID and access controller modules. The wireless access point (402) consists of multiple virtual access points, each represented by a unique SSID (404, 406, 408) and each SSID is equipped with its access controller (412, 414, 416).

Figure 5:
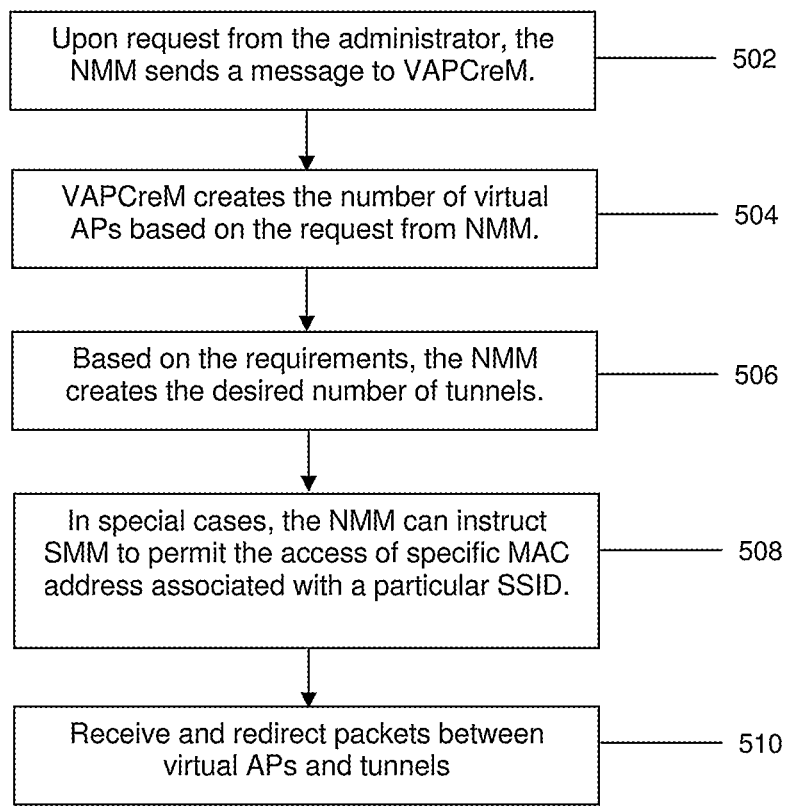
FIG. 5 illustrates a flowchart of the method for providing multiple SSIDs in a single access point according to the present disclosure.

Reference is now made to FIG. 5. FIG. 5 illustrates a flowchart of the method for providing multiple SSID in a single access point according to the present disclosure. The access controller according to the present disclosure comprises a network management module, a virtual access point creation module and a data traffic handling module.

In response to a request received from an administrator through the network management module (NMM) (502), the virtual access point creation module (VAPCreM) creates multiple virtual access points, each represented by a unique SSID (504). This is achieved by altering the original MAC address of the access point. The network management module then provides at least one tunnel to accommodate the multiple virtual access points (506). The network management module may provide one tunnel to accommodate multiple virtual access points or multiple tunnels to accommodate multiple virtual access points.

The access controller may further comprise a security management module (SMM) for the purpose of authorization, authentication, and accounting of data from the multiple virtual access points (508). Alternatively, the system may comprise an external RADIUS server for the purpose of authorization, authentication, and accounting of data from the multiple virtual access points. In special cases, the NMM can instruct the SMM to permit the access of a specific MAC address associated with a particular SSID.

Figure 6A:
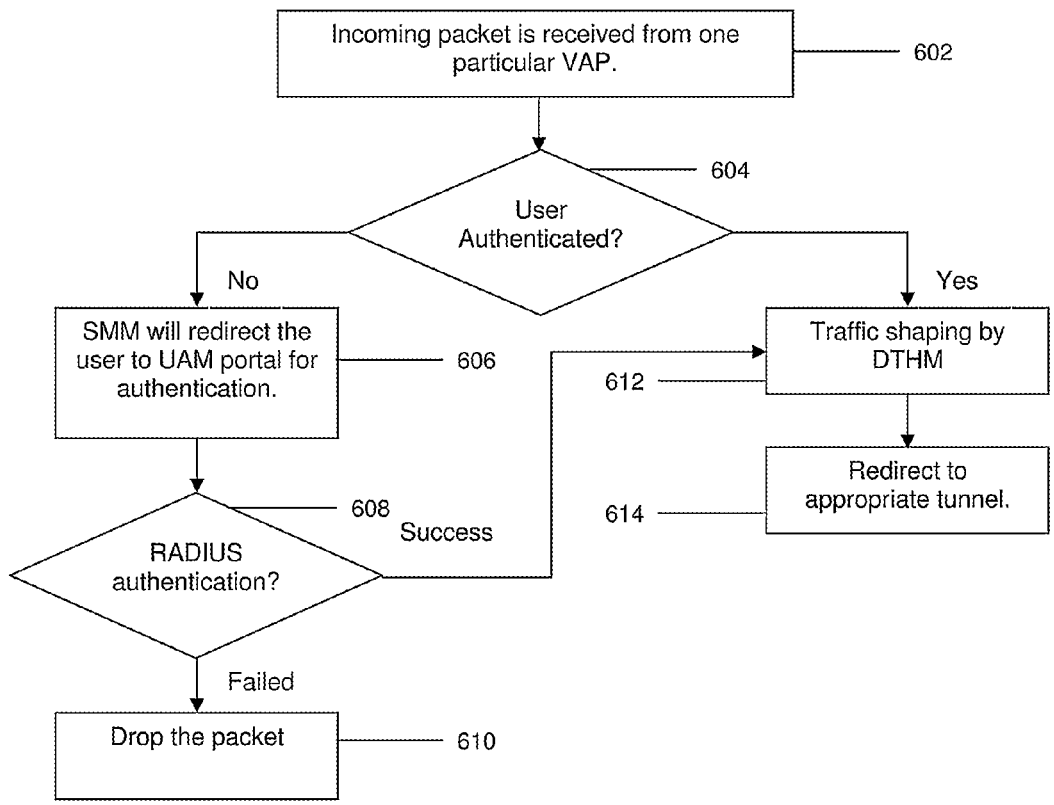
FIGS. 6A and 6B illustrate flowcharts of the method for receiving and redirecting data from the multiple virtual access points to and from the at least one tunnel.
Figure 6B:
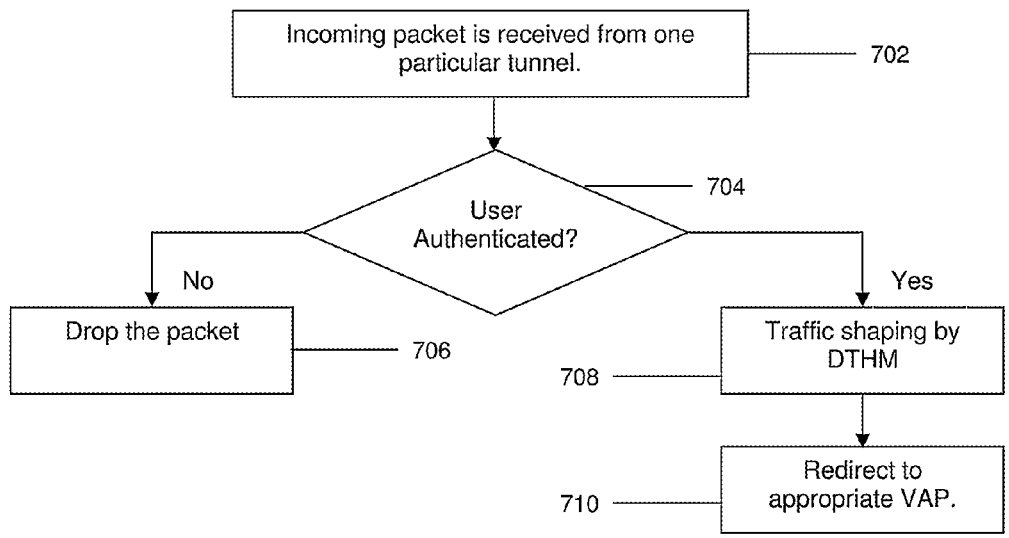

The data traffic handling module receives and redirects data from the multiple virtual access points to and from the tunnel (510). Reference is now made to FIGS. 6A and 6B. FIGS. 6A and 6B illustrate flowcharts of the method for receiving and redirecting data from the multiple virtual access points to and from the tunnel.

Upon receiving an incoming data packet (602) from one of the multiple virtual access points, the network management module instructs the security management module (604) to authenticate the user. If authentication fails, the security management module redirects the user to a Universal Access Method (UAM) server (606) for authentication by the external RADIUS server (608). If user authentication is successful, the data traffic handling module shapes (612) and redirects (614) the incoming data packet to the tunnel. Otherwise, the incoming data packet is dropped (610) if authentication fails.

Upon receiving an incoming data packet (702) from the tunnel, the network management module instructs the security management module (704) to check whether the user is already authenticated. If user has already been successfully authenticated, the data traffic handling module shapes (708) and redirects (710) the incoming data packet to one of the multiple virtual access points. Otherwise, the incoming data packet is dropped (706) if the user has not been successfully authenticated.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for providing multiple service set identifiers (SSIDs) in a single access point, comprising:
by a virtual access point creation module of an access controller, creating multiple virtual access points for the single access point, each virtual access point represented by a unique SSID, wherein said creating comprises altering an original media access control (MAC) address of the access point;
by a network management module of the access controller, providing at least one tunnel to accommodate the multiple virtual access points;
by the network management module, instructing a security management module to permit access of a specific MAC address associated with a specific SSID;
by the security management module of the access controller, authenticating a user associated with incoming data;
by the security management module, if user authentication fails, redirecting the user to a universal access method server; and
by a data traffic handling module of the access controller, if user authentication is successful, receiving and redirecting the incoming data from the multiple virtual access points to the at least one tunnel.

2. The method according to claim 1, wherein creating the multiple virtual access points each represented by a unique SSID is in response to a request received from an administrator.

3. The method according to claim 1, wherein the method further comprises authorizing, authenticating, and accounting of data from the multiple virtual access points.

4. The method according to claim 1, wherein the method further comprises authorizing, authenticating, and accounting of data from the multiple virtual access points via an external RADIUS server.

5. The method according to claim 1, further comprising, by the data traffic handling module, shaping the incoming data prior to redirecting the data from the multiple virtual access points to the at least one tunnel.

6. The method according to claim 1, further comprising receiving, shaping, and redirecting data from the at least one tunnel to at least one of the multiple virtual access points.

7. The method according to claim 6, wherein the shaping and redirecting of the data from the at least one tunnel to the at least one virtual access point is responsive to successful user authentication.

8. A computer system for providing multiple service set identifiers (SSIDs) in a single access point, the computer system comprising at least one processor, the computer system being programmed to:
cause a virtual access point creation module of an access controller to create multiple virtual access points for the single access point by altering an original media access control (MAC) address of the access point, each virtual access point represented by a unique SSID;
cause a network management module of the access controller to provide at least one tunnel to accommodate the multiple virtual access points;
cause the network management module to instruct a security management module to permit access of a specific MAC address associated with a specific SSID;
cause the security management module of the access controller to authenticate a user associated with incoming data;
if user authentication fails, cause the security management module to redirect the user to a universal access method server; and
if user authentication succeeds, cause a data traffic handling module of the access controller to receive and redirect the incoming data from the multiple virtual access points to the at least one tunnel.

9. The system according to claim 8, wherein the instructions are further configured to cause the virtual access point creation module to create the multiple virtual access points each represented by a unique SSID in response to a request received from an administrator through the network management module.

10. The system according to claim 8, wherein the system further comprises an external RADIUS server for the purpose of authorization, authentication, and accounting of data from the multiple virtual access points.

11. The system according to claim 8, wherein the instructions are further configured to cause the data traffic handling module to shape the incoming data prior to redirecting the data from the multiple virtual access points to the at least one tunnel.

12. The system according to claim 8, wherein the instructions are further configured to cause the data traffic handling module to receive, shape, and redirect data from the at least one tunnel to at least one of the multiple virtual access points.

13. The system according to claim 12, wherein the shaping and redirecting of the data from the at least one tunnel to the at least one virtual access point is responsive to successful user authentication.

\* \* \* \* \*